United States Patent [19]

Pecota

[11] 4,237,367
[45] Dec. 2, 1980

[54] NO-RELIGHT CIGAR LIGHTER SOCKET

[75] Inventor: Walter Pecota, Parsippany, N.J.

[73] Assignee: Wagner Electric Corporation, Parsippany, N.J.

[21] Appl. No.: 967,058

[22] Filed: Dec. 6, 1978

[51] Int. Cl.³ .............................................. F23Q 7/24
[52] U.S. Cl. ................................... 219/265; 219/263; 219/264; 219/512
[58] Field of Search ...................... 219/260, 263–267, 219/270, 512

[56] References Cited

U.S. PATENT DOCUMENTS

| | | | |
|---|---|---|---|
| 2,117,703 | 5/1938 | Cohen | 219/264 |
| 2,140,311 | 12/1938 | Cohen | 219/264 |
| 2,248,026 | 7/1941 | Lehmann | 219/264 |
| 2,848,590 | 8/1958 | Ashton et al. | 219/264 |
| 3,238,353 | 3/1966 | Lybrook | 219/265 |
| 3,419,703 | 12/1968 | Sicard | 219/265 |
| 3,439,148 | 4/1969 | Horwitt | 219/265 |
| 3,662,153 | 5/1972 | Barnes, Jr. et al. | 219/265 |
| 3,887,789 | 6/1975 | Pecota | 219/265 |

Primary Examiner—Volodymyr Y. Mayewsky
Attorney, Agent, or Firm—Eyre, Mann, Lucas & Just

[57] ABSTRACT

The bimetallic clamping member of a cigar lighter socket is expanded and lengthened to completely disengage the burner cup when the cigar lighter is pressed fully into its socket. An insulating coating on a stop member ensures that no electrical circuit is established through the burner while the cigar lighter remains pressed.

5 Claims, 4 Drawing Figures

NO-RELIGHT CIGAR LIGHTER SOCKET

BACKGROUND OF THE INVENTION

The present invention relates to no-relight cigar lighter sockets.

There is increasing use today in automobiles of plastic dashboards. Plastic dashboards can suffer distortion and damage due to excess of temperatures above about 200° F.

Conventional cigar lighters employ a clamping device of bimetal material in the socket into which the burner cup is pressed and the burner cup is retained there and fed electrical current by the clamp members. When the heater element in the burner cup reaches a predetermined temperature, the bimetallic clamp members relax to release the burner cup and the burner cup is partially retracted by a spring. Movement of the burner cup alerts the operator to the fact that the lighter is ready for use.

Some impatient users of cigar lighters attempt to excessively heat the burner by holding the burner cup into the clamp members for longer than would be permitted by the bimetallic elements. This can increase the temperature of the burner and burner cup to very high values. In fact, it is not uncommon to actually melt metallic parts of a cigar lighter from such use when continued for a long time. Overheating of the cigar lighter on this scale is far beyond the permissible temperature for plastic dashboards.

The continuous overheating just described is most severe in prior art cigar lighters which have metallic stops to limit the inward penetration of the burner cup. These metallic stops are usually connected to the same electrical source as are the bimetallic clamps. Consequently, pushing in on the cigar lighter establishes an energization circuit through the stop as well as through the bimetallic clamps.

One approach to reducing the severity of overheating in prior art cigar lighters is taught in U.S. Pat. No. 3,887,789, herein incorporated by reference, in which the surfaces of the mechanical stop which are abutted by the burner cup are coated with an insulating high temperature ceramic material. The insulating ceramic coating prevents the feeding of current to the burner through the mechanical stop. This prior art patent, however, still permits the bimetallic clamp elements to contact the sides of the burner cup when the cigar lighter is pressed fully into the socket. As the burner cup heats up, the bimetallic clamp elements loosen their contact with the burner cup and, when hot enough, are moved at least partially out of contact therewith. Manufacturing tolerances, however, make it common for good electrical contact to continue on one or both of the bimetal clamping members on the burner cup to temperatures well above the damage point of plastic dashboards.

SUMMARY OF THE INVENTION

The present invention solves the relight problem in the prior art by positively breaking electrical contact to the burner cup when the cigar lighter is pressed fully into its socket. Consequently, the only mode in which the cigar lighter can be heated is in the normal mode wherein the burner cup is retained in the clamping bimetallic members against the urging of the return spring. Therefore, when the burner cup reaches the predetermined release temperature, the bimetallic elements release the burner cup and stop the heating procedure.

The bimetallic elements are lengthened and expanded at the base to describe a truncated cone. By lengthening the bimetallic elements, the burner cup can pass through and beyond the clamping fingers and pass completely out of contact with the bimetallic element. A metallic stop, coated with a high temperature ceramic prevents energization of the burner by an electrical path through the mechanical stop. Since electrical contact with the burner cup is completely eliminated when the burner cup is pressed fully into the lighter, this action is incapable of continuing to heat the burner. Consequently, damage to plastic dashboards is avoided.

DETAILED DESCRIPTION OF THE PREFERRED EMBODIMENT

Figure 1:
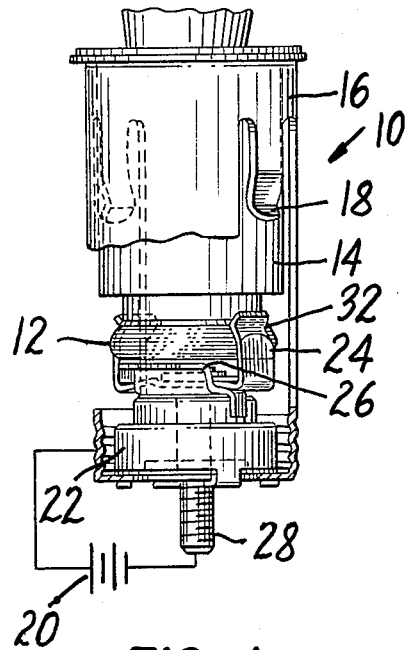
FIG. 1 shows a cigar lighter in partial cross section according to the prior art.

Referring now to FIG. 1 there is shown generally at 10 a cigar lighter according to the prior art. A burner cup 12 is spring loaded upward into a shroud 14 by a spring, not shown, within the shroud 14.

A lighter socket 16 is attached to the dashboard or other element of a vehicle, not shown. The shroud 14 slides into the lighter socket 16 and makes electrical contact with spring fingers 18. Conventionally, the vehicle and lighter socket 16 are maintained at ground potential by connection to a battery shown schematically at 20. Internal connections in the lighter 10 make connection from the shroud 14 to the center of a conventional spiral burner in the center of the burner cup 12. Since the internal details of the connection of electricity from the shroud 14 to the center of the burner, not shown, are conventional, they are not shown or described in detail.

A ceramic washer 22 in the base of the lighter socket 16 provides an insulated mounting platform for a pair of bimetallic clamps 24 and a mechanical stop 26. A stud 28, passing through the ceramic washer 22, secures the bimetallic clamps 24 and the mechanical stop 26 atop the ceramic washer 22 and also provides electrical connection from the positive terminal of the battery 20 to these elements.

Figure 2:
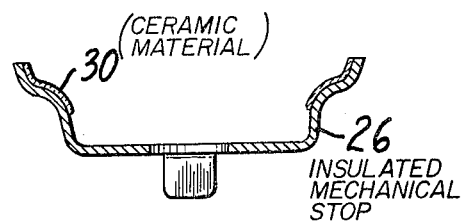
FIG. 2 shows a detailed view of a mechanical stop in cross section.

The mechanical stop 26 is insulated from the burner cup 12 by any means but is preferably insulated by a layer of high temperature ceramic material such as the layer 30 shown in FIG. 2.

Inward deformations 32 at the upper ends of the bimetallic clamps 24 require that the bimetallic clamps 24 be distorted outward to permit the passage of the burner cup 12 past the inward deformations 32 and then, the inward deformations 32 spring back behind the burner cup 12 and retain it in position against the biasing force of the return spring in the shroud 14.

As the burner heats up, the temperature transmitted to the bimetallic clamp 24 causes the bimetallic material to reduce its holding force in proportion to the temperature. At some temperature, the bimetallic clamp 24 is no longer able to hold the burner cup 12 against the force of the return spring, not shown. The burner cup 12 is thereupon drawn free of the bimetallic clamps 24 and the lighter 10 is ready for use.

An impatient driver or one who waits too long to withdraw the cigar lighter from the socket is inclined to reinsert the cigar lighter 10 in the socket 16 and hold the burner cup 12 in contact with the bimetallic clamp 24 and/or the mechanical stop 26 until it again heats up or, in fact, overheats. If the mechanical stop 26 is insulated with a high temperature ceramic material to prevent it from contributing to overheating of the burner, the only remaining source of electricity is the bimetallic clamp 24. With the arrangement shown in the prior art of FIG. 1, the bimetallic clamp 24 is capable of maintaining electrical contact with the burner cup 12 to temperatures far beyond the temperature at which the bimetallic clamp 24 would release the burner cup 12 under the force of the return spring when the burner cup 12 is positively held in the fully inward position shown. Therefore, the electricity supplied through the burner cup 12 to the burner may energize the burner to the point that sufficient heat is generated to deform or even melt a plastic dashboard.

Figure 3:
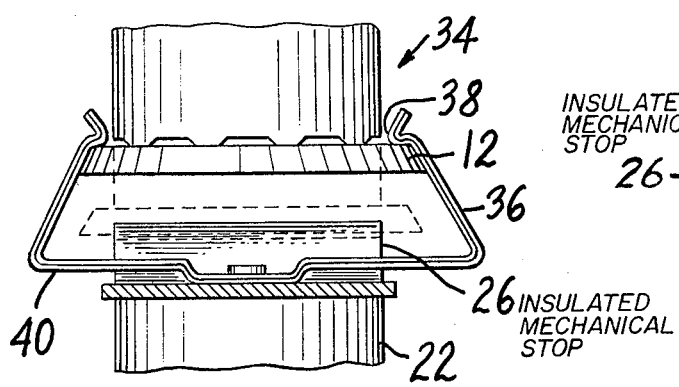
FIG. 3 shows a cross section of a detailed portion of a cigar lighter according to the present invention.

Referring now to FIG. 3, a positive no-relight cigar lighter is shown generally at 34. In this embodiment, a lengthened bimetallic clamp 36 having inward deformations 38 captures and holds the burner cup 12 shown in full line against the biasing force of the return spring in the shroud 14, not shown. In contrast to the embodiment shown in FIG. 1, the embodiment in FIG. 3 provides a substantial clearance between the burner cup 12 and the mechanical stop 26 when the burner cup 12 is normally captured behind the inward deformations 38 of the lengthened bimetallic clamps 36. In addition, the lengthened bimetallic clamps 36 are substantially wider near their bases 40 than near the inward deformations 32 to provide clearance for the burner cup 12. Consequently, when the burner cup 12 is pressed fully inward by an impatient operator, the burner cup 12 is placed into mechanical contact with the insulated mechanical stop 26 but is fully disengaged from the lengthened bimetallic clamp 36 even when the lengthened bimetallic clamp 36 is at normal ambient temperature. Consequently, the full depression of the lighter 34 within the socket merely results in a complete breaking of electrical contact with the burner cup 12 and consequently does not permit heating of the burner in this condition. It is only upon the release of the lighter 34 by the operator that the burner cup 12 can come into contact with inward deformations 38 on the lengthened bimetallic clamp 36 before the heating process can be initiated. In this condition, the burner cup 12 attains a predetermined temperature, the holding force of the lengthened bimetallic clamps 36 is reduced sufficiently to release the burner cup 12 and permit withdrawal thereof by the return spring.

Figure 4:
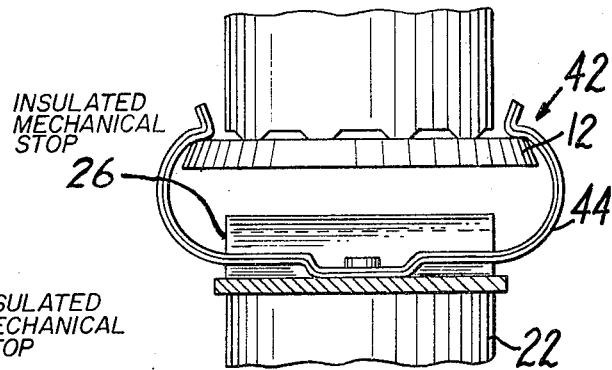
FIG. 4 shows a cross section of a modified detailed portion of a cigar lighter according to the present invention.

FIG. 4 shows another embodiment of a positive no-relight cigar lighter at 42. Lengthened bimetallic clamps 44 are bowed outward to increase the clearance with the burner cup 12.

The present invention should not be considered limited to a cigar lighter employing two bimetallic clamps 36, but instead, should be considered to encompass cigar lighters employing any number of bimetallic clamps performing the gripping and releasing function previously described. In addition, it should not be inferred from the present description that the invention is limited to an apparatus employing metallic, ceramic-coated stops. Alternative embodiments such as those employing a ceramic stop or other insulators should be considered to be within the contemplation and scope of the present invention.

It will be understood that the claims are intended to cover all changes and modifications of the preferred embodiments of the invention, herein chosen for the purpose of illustration which do not constitute departures from the spirit and scope of the invention.

What is claimed is:

1. A no-relight cigar lighter socket comprising:
   (a) a socket housing;
   (b) an electrically conducting stud secured to and electrically insulated from the socket housing;
   (c) a bimetallic clamp means affixed to said stud, said bimetallic clamp means being capable of retaining an electrically-conducting burner cup of a cigar lighter at a first extended position when the same is inserted therein;
   (d) an electrically insulated stop member affixed to said electrically-conducting stud for limiting the maximum insertion of said electrically-conducting burner cup of said cigar lighter;
   (e) said electrically-insulated stop member limiting the maximum extension of said electrically-conducting burner cup to a second extended position in response to force urging further extension;
   (f) said bimetallic clamp means being operative to connect electrical heating power to said electrically-conducting burner cup in said first extended position whereby an electric lighting element in said electrically conducting burner cup is heated;
   (g) said bimetallic clamp means being adapted to release said electrically conducting burner cup upon said electrically conducting burner cup attaining a predetermined temperature; and
   (h) said bimetallic clamp means having means for providing mechanical clearance between said electrically-conducting burner cup and said bimetallic clamp means when said electrically-conducting burner cup is urged from its first extended position toward its second extended position whereby there is electrical contact between said bimetallic clamps and said electrically-conducting burner cup only when said electrically-conducting burner cup is in said first extended position.

2. The no-relight cigar lighter socket of claim 1 wherein said means for providing mechanical clearance comprises:
   (a) said bimetallic clamp means being at least first and second bimetallic clamps having inward deformations at first ends thereof, said at least first and second bimetallic clamps being spaced apart and the space therebetween being a force fit for said electrically-conducting burner cup past said inward deformations;
   (b) said inward deformations closing behind said electrically-conducting burner cup and retaining it in said first extended position;
   (c) said electrically insulated stop member facing said electrically-conducting burner cup and being spaced substantially inward therefrom when said electrically-conducting burner cup is in its first extended position; and
   (d) said at least first and second bimetallic clamps axially inward of said inward deformations being shaped outward radially of said electrically-conducting burner cup, the outward shape providing mechanical clearance between said electrically-conducting burner cup and said first and second bimetallic clamps when said electrically-conducting burner cup is urged beyond said first extended position toward said second extended position.

3. The no-relight cigar lighter recited in claim 2 wherein said outward shape is truncated conical being wider in the axially inward direction.

4. The no-relight cigar lighter recited in claim 2 wherein said outward shape is rounded.

5. In a no-relight cigar lighter having a socket for electrical engagement of a burner cup in a lighter plug for electrical heating of an igniting element in said burner cup, said socket comprising:
   (a) a socket housing;
   (b) an electrical stud secured and electrically insulated from the socket housing;
   (c) a bimetallic clamp means affixed to said stud, said bimetallic clamp means being capable of retaining said burner cup at a first extended position when said burner cup is inserted therein;
   (d) an electrically-insulated stop member affixed to said stud for limiting the maximum insertion of said burner cup;
   (e) said electrically-insulated stop member limiting the maximum extension of said burner cup to a second extended position in response to outside force urging further extension;
   (f) said bimetallic clamp means being adapted to release said burner cup upon said burner cup attaining a predetermined temperature; and
   (g) said bimetallic clamp means being formed to provide mechanical clearance between said burner cup and said bimetallic clamp means whenever said burner cup is urged from its first extended position toward said second extended position.

* * * * *